June 18, 1968    J. BROTHERS    3,389,275
PIEZOELECTRIC GENERATOR UNIT FOR SPACE VEHICLES
Filed Jan. 19, 1967
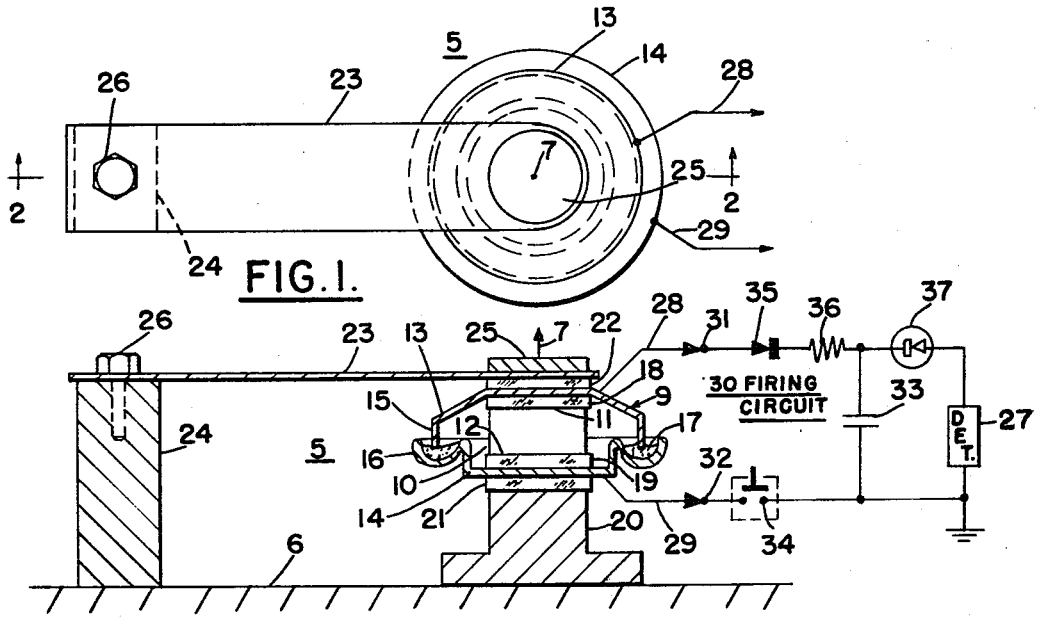
FIG. 1.
FIG. 2.
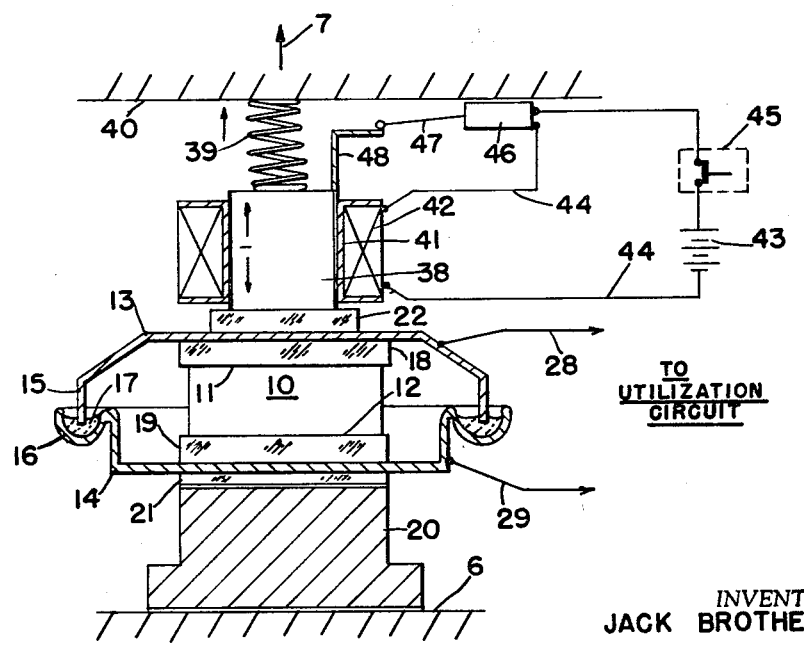
FIG. 3.
INVENTOR.
JACK BROTHERS United States Patent Office 3,389,275
Patented June 18, 1968

3,389,275
PIEZOELECTRIC GENERATOR UNIT FOR SPACE VEHICLES
Jack Brothers, Succasunna, N.J., assignor to the United States of America as represented by the Secretary of the Army
Filed Jan. 19, 1967, Ser. No. 610,450
8 Claims. (Cl. 310—8.3)

ABSTRACT OF THE DISCLOSURE

A piezoelectric crystal wafer is enclosed in a casing comprising its own electrodes which are of thin flexible conductive material and cup-shaped with the edges meeting in opposed relation and joined by an annular body or ring of insulating material. One electrode is secured to fixed support means of relatively large weight and mass in a carrier such as a projectile, and the other is connected with a body of relatively lesser weight and mass which is free to respond to setback force and vibrate on the crystal axis with respect to the fixed support means, thereby to apply relative vibratory movement to the electrode connected therewith for voltage generation. The vibratory body or mass is spring mounted and may derive motion from vibratory motor means or from setback forces on launching.

---

The present invention relates to piezoelectric generator means for use in projectiles and the like, and more particularly to piezoelectric generator means of the vibratory type.

It is known that compression and tension forces may be applied to a piezoelectric crystal to derive output voltage and current. Also it is known that voltage and current sources of this type generally may be adapted for initiating operation of fuzes and like detonation initiating elements in projectiles and other space vehicles of that type. Among these, storage devices and conventional generators may be used although they are generally complex in construction and of considerable size and weight. The piezoelectric-crystal type generator used is generally of the plug-in type and employs a crystal holder of the unsealed box type.

It is an object of the present invention to provide an improved piezoelectric generator unit which avoids the usual bulky box construction while completely enclosing and substantially encapsulating the crystal element thereof, and which includes simplified motor means and a unitary electrodal and casing structure.

It is a further object of this invention to provide an improved and effective piezoelectric generator unit for deriving electric energy for initiating detonation in a space vehicle, such as a projectile after launching.

A further object of the invention is to provide an improved inertia-actuable piezoelectric generator unit adapted for hermetic sealing of the crystal element thereof and for direct vibratory drive of the electrodal elements thereby to simplify the construction and better adapt said unit for use in space vehicles in flight.

In accordance with one form of the invention, a piezoelectric generator of the type referred to is adapted for response to inertial set back on launching of a carrier projectile, through the use of a mass-carrying vibratable reed connected between the generator and a fixed hinge or pivot axis.

Further in accordance with the invention, means responsive to operating current from a low-voltage source may be provided to drive the generator means directly, as part thereof, in place of the inertial vibratory means above referred to. The generator is of the enclosed type wherein the crystal holder and electrodal elements may comprise opposed cup-like casing members having peripheral edges adapted to be secured or hermetically sealed together by an annular body or ring of insulating material, such as glass. The casing is subject to compression and tension on the axis thereof and the crystal axis which are the same and aligned, in use, with the direction of movement of the carrier. One electrode is seated on and secured to a pedestal or like fixed support means of relatively large weight and mass, while the other electrode is connected with a body or element of relatively lesser weight and mass which is subject to movement by vibration and resiliently biased in one direction. The last named body or element is generally a movable solenoid core for operating as above noted, with current from a low-voltage source.

The piezoelectric crystal may be a relatively-thick round disk or body having opposite flat conductive end faces or surfaces provided by thin coatings of suitable conductive material, such, for example as silver solder or lead-zinc solder, deposited or vaporized thereon. The electrodes are presently connected with the crystal surfaces by cementing with thin layers of conductive cement and are further connected with the driving means through thin layers of non-conducting cement.

The entire unit is compact and simplified in construction, embodying a minimum of elements, and is reliable in operation.

The invention will further be understood from the following description of certain presently preferred embodiments thereof, when considered with reference to the accompanying drawing, and its scope is pointed out in the appended claims.

In the drawing,

FIG. 1 is a top or plan view of a generator unit embodying the invention,

FIG. 2 is a side view, in elevation and partly in section, of the generator unit of FIG. 1 taken on the section line 2—2, to show further details thereof in accordance with the invention, and a utilization circuit therefor in schematic form, and FIG. 3 is a side view, in elevation and partly in section, in the same manner as FIG. 2, showing a modification thereof further in accordance with the invention.

Referring to the drawing, wherein like elements throughout the three figures are designated by like reference numerals, and referring particularly to FIGS. 1 and 2, a piezoelectric generator 5 is adapted to be mounted in a space vehicle having an interior mounting platen or flat surface 6, in coaxial relation with the operating axis or axis of movement 7 thereof.

The generator is of improved construction including a combined cover and electrodal structure 9 for a round piezoelectrical crystal or wafer 10 having opposed flat end faces 11 and 12. The cover and electrodal structure 9 includes two similar round cup-shaped electrodes 13 and 14 which are mounted in opposed edge-to-edge relation to provide a separable two-part casing for the crystal 10. The edges 15 and 16 are complementary and are adapted to be sealed together by an annular body or ring of insulating material 17 held in an annular outer crimped portion or open trough formed in the edge 16. The cylindrical edge 15 is then set and held in the insulation material as it hardens in place after pouring.

The end faces 11 and 12 of the crystal 10 are connected electrically and mechanically to the electrodes 13 and 14 by layers of conductive cement 18 and 19 which are coated thereon. These may be relatively thin, although shown in greater thickness in the drawing for a clear cross-section. The complete unit is mounted on a relatively heavy pedestal or base 20, which is preferably round, and secured to the paten 6 in the carrier or projectile on the axis 7. A layer or disk 21 of insulating cement is provided to attach the electrode 14 to the pedestal 20 and a similar layer or disk 22 of insulating cement is provided between the upper electrode 13 and the free end of a thin flat leaf spring 23.

The spring 23 is relatively long and flexible and extends to an anchor post 24 of relatively large weight and mass secured to the platen 6. The anchor post is of a height to hold the spring 23 level and unstressed in the rest position shown. A button weight or circular disk 25 of metal provides a vibratory mass at the free inner end of the spring and is cemented or otherwise secured thereto. A bolt 26 or like fastening means may be used to clamp the opposite or outer end of the spring to the top of the post 24.

The set-back reaction along the axis 7 at launching or firing of the carrier or projectile causes compression of the upper electrode 13 by the mass 25, and of the electrode 14 against the pedestal 20. In steady flight the mass and electrode move to compress and decompress the crystal 10 alternately as the spring is set into vibration. Thus an alternating-current output at a predetermined voltage is derived by this action and may be utilized to initiate an explosive train for the projectile by an electric detonator 27, for example the latter may be connected with said electrodes through output leads 28 and 29 and a firing circuit 30 having respective input terminals 31 and 32 connected therewith.

The firing circuit, shown by way of example, includes a storage or firing capacitor 33 connected with the input terminals 31 and 32 through an arming switch 34 and series-connected diode rectifier 35 and control resistor 36. The firing capacitor receives rectified alternating current through the diode rectifier 35 at a rate controlled by the resistor 36 until it reaches full charge sufficient to apply a firing pulse to the detonator with which it is also connected through a gating diode or like device 37 having a reverse-current breakdown point at the desired charge voltage on the capacitor 33. The arming switch 34 is closed on launching or during flight up to point of impact in accordance with normal practice for this type of safety device in projectiles and the like. The firing circuit represents one of several utilization means that may be used with the generator of the present invention.

Referring to FIG. 3, the piezoelectric generator of FIGS. 1 and 2 is modified to include a different driver means. Instead of the set back vibratory reed and spring, a low-voltage solenoid driver means is integrated with the piezoelectric unit. Here, as in the preceding example, the crystal 10 is enclosed or encapsulated within the electrodal and casing structure 9 and mounted on the massive pedestral 20 in connection with the fixed planar surface 6 of an interior element of the carrier or projectile.

In this case, however, the upper electrode 13 is connected to a solenoid magnet plunger or core 38 by the layer or disk of insulating cement 22. The plunger 38 is resiliently biased along the axis 7 outwardly (upwardly in the drawing) by a coiled tension or biasing spring 39 which is welded or otherwise attached thereto at the end and connected with a supporting wall 40 in the interior of the carrier.

The solenoid plunger 38 is freely movable in and is guided by a coil form 41 for the solenoid winding 42 which surrounds it. The winding is of the low-voltage type adapted to be energized by a battery 43 or like low-voltage source of electric current. The battery circuit comprises the winding leads 44, the battery 43, a safety or arming switch 45 and a microswitch 46 having an operating arm or lever 47. The latter is in contact with a bracket 48 connected with the plunger 38 and movable therewith.

In the position shown, the safety switch 45 being closed, the microswitch 46 is likewise closed and the solenoid winding draws the plunger 38 against the electrode 13 to apply compression to the crystal 10 and to generate a half wave of output electric current at the leads 28-29. The microswitch 46 opens as the bracket 48 lowers slightly, thus deenergizing the winding 42 and permitting the core 38 to be withdrawn slightly or biased to move (upwardly in the drawing) by the retracting action of the spring.

The withdrawal of pressure and the application of tension on the unit by the spring 39 causes an output pulse of current from the electrodes in the opposite direction or polarity from the first. The switch 46 recloses to energize the solenoid and the cycle repeats at a relatively high rate dependent upon the mass of the moving parts. An alternating current output from the generator is thus applied to the output leads 28 and 29.

The biasing force acting in opposition to the solenoid magnet force may be provided by the biasing spring 39 acting in compression instead of tension, so that the spring is compressed by the solenoid movement and the solenoid plunger is then moved in the opposite direction as the compressed spring expands. In this case the switch 46 opens as the solenoid plunger moves (upwardly in the drawing) to compress the spring 39. The piezoelectric crystal 10 is operated in compression and tension the same as before to produce alternating current output.

From the foregoing description it will be seen that an improved piezoelectric generator unit may be provided for direct drive of the electrodal elements by inertial means while the crystal element is effectively encapsulated thereby.

Furthermore, the piezoelectric casing and electrodes are adapted for operation by resilient spring biasing means acting either in tension or compression, or wholly vibratory as in the case of the flat spring. In any case structural simplicity, effective operation and low cost construction are characteristics of this improved piezoelectric generator.

I claim:

1. A piezoelectric generator unit comprising, a piezoelectric crystal having opposed end surfaces, two cup-like electrodes affixed one to each of said end surfaces and joined at their outer edges to enclose said crystal, means providing an inertial mass in fixed connection and coaxial with one of said electrodes, said electrodes having a flexibility effective to facilitate relative axial movement therebetween upon actuation and movement of said mass along the axis of the crystal, supporting means of relatively massive proportions for said crystal and inertial mass, said supporting means being resiliently connected with said inertial mass and fixedly connected with the other of said electrodes in coaxial opposed relation to said inertial mass, for effecting relative movement between said electrodes upon setback and voltage output from said crystal through said electrodes.

2. A piezoelectric generator unit as defined in claim 1, wherein the electrodes are of relatively thin conducting material to provide flexibility in axial compression and tension and joined at their outer edges by an annular peripheral groove on one electrode for receiving the outer edge portion of the other electrode in complementary relation as an enclosure, and an annular body of insulating material in said groove electrically separating and mechanically joining said electrodes at said outer edges to seal the enclosure.

3. A piezoelectric generator comprising a piezoelectric crystal having electrodal elements on opposed faces thereof, means for creating vibratory mechanical stress directly on said electrodal elements and crystal faces, said means including an operating coil and an armature element movable in response to energization of said coil and affixed directly to one of said electrodal elements, means providing a source of operating current for said coil, vibratory switching means in series with said coil and source of energy for effecting alternate energization and deenergization of said coil and alternate compression and tension on said electrodal elements and the crystal faces for generating an output voltage at said electrodal elements, and supporting means of relatively large mass fixedly connected to the other of said electrodal elements and resiliently connected with said armature element.

4. A piezoelectric generator, comprising in combination, a piezoelectric crystal of the flat disk type having conductive electrodal opposed faces, means for applying vibratory tension and compression forces to said crystal at said faces to generate alternating current, said means including a pair of cup-shaped electrodes in coaxial insulated edge-to-edge relation providing a casing for said crystal and being conductively and mechanically attached to said crystal one with each face thereof, external means providing a fixed relatively large mass connected with one of said electrodes in alignment with the axis thereof, means providing a lesser mass in connection with the other electrode in alignment with said axis, and means providing a vibratory motion for said last named means and mass acting along said axis in direct connection with said other electrode for applying said vibratory tension and compression forces to said crystal, and terminal means on said electrodes for deriving an output voltage therefrom.

5. Piezoelectric generator means of the vibratory type comprising, a piezoelectric crystal of round wafer form having opposed conductively-coated end faces, two round cup-shaped electrodes conductively bonded one to each of said end faces along an inner surface thereof and coaxial therewith to effectively enclose said crystal in annular edge-to-edge relation as a casing therefor, one electrode being of cylindrical form at the outer edge thereof and the other electrode providing an outer annular trough for receiving said edge in complementary relation, an annular ring of insulating material in said trough providing an electrical insulator and a mechanical bond between said electrodes, whereby said casing is effectively hermetically sealed, exterior means providing a relatively-rigid mass in mechanical engagement with one of said electrodes centrally thereof and in alignment with the interior crystal, and exterior means connected with the other of said electrodes centrally thereof and in coaxial alignment with the interior crystal for imparting vibratory motion thereto in opposed relation to said rigid mass, whereby the crystal is subject to vibratory compression and tension to produce an alternating current output at said electrodes.

6. A piezoelectric generator means as defined in claim 5, wherein the exterior means providing a relatively rigid mass in mechanical engagement with the one of said electrodes is a fixed relatively-large and heavy pedestal element bonded to said electrode, and wherein the means for imparting vibratory motion to the other of said electrodes includes a movable body of material providing an inertial mass secured to said electrode and a biasing spring at one end attached to said movable body and anchored at the other end thereby to provide tension and compression forces for maintaining vibratory motion imparted to said electrode and inertial mass.

7. Piezoelectric generator means as defined in claim 6, wherein the body providing the inertial mass is a solenoid core and wherein a solenoid winding is provided around the core and periodically excited to impart a moving force to the core and attached electrode.

8. A piezoelectric generator unit comprising, encapsulating casing means comprising two separable complementary cup-shaped electrodes in edge-to-edge coaxial relation, a piezoelectric crystal disk having spaced flat end faces conductively coated and attached to the inner central areas of said electrodes in coaxial relation thereto, means providing a sealed closure between said electrodes at the edges thereof including a fold in one electrode terminating in an annular trough into which the edge of the other electrode depends together with an annular body of insulating material in said trough mechanically joining and electrically insulating said electrodes one from the other, inertial weighted elements attached to each electrode in coaxial relation thereto, one element being fixed and the other being spring biased in one direction, and means for imparting motion to said spring-biased element in opposition to the bias to establish relative vibratory movement of the electrodes and generate alternating-current output voltage therebetween in response to axial compression and extension of the crystal disk.

References Cited

UNITED STATES PATENTS

| | | | |
|---|---|---|---|
| 3,042,744 | 7/1962 | Shoor | 310—8.4 X |
| 3,239,678 | 3/1966 | Kolm et al. | 310—9.1 X |
| 3,324,317 | 6/1967 | Hazelet | 310—8.4 |

RODNEY D. BENNETT, *Primary Examiner.*

B. L. RIBANDO, *Assistant Examiner.*